United States Patent [19]
Horne et al.

[11] 3,874,926
[45] Apr. 1, 1975

[54] METHOD AND APPARATUS FOR INJECTING FOAM INTO A PIPE

[75] Inventors: Frederick F. Horne, Carmel Valley; Gerald G. Vanderlans, Lodi, both of Calif.

[73] Assignee: Airrigation Engineering Company, Inc., Carmel Valley, Calif.

[22] Filed: July 12, 1973

[21] Appl. No.: 378,524

[52] U.S. Cl. .............. 134/24, 134/22 C, 134/36, 134/167 C, 134/168 C, 261/DIG. 26
[51] Int. Cl. .............................................. B08b 9/02
[58] Field of Search ............ 134/22 R, 22 C, 24, 36, 134/166 C, 167 C, 168 C, 169 C; 4/256; 138/93; 252/359 E; 261/DIG. 26

[56] References Cited
UNITED STATES PATENTS

| | | | |
|---|---|---|---|
| 2,273,984 | 2/1942 | Osborn | 134/167 C |
| 3,037,887 | 6/1962 | Brenner et al. | 134/36 X |
| 3,075,535 | 1/1963 | Lasting | 134/167 C |
| 3,337,195 | 8/1967 | Farison | 261/DIG. 26 |
| 3,637,021 | 1/1972 | Hutchinson et al. | 134/36 X |
| 3,741,807 | 6/1973 | Horne | 134/24 |

Primary Examiner—S. Leon Bashore
Assistant Examiner—Marc L. Caroff
Attorney, Agent, or Firm—Wickersham & Erickson Owen

[57] ABSTRACT

A method and apparatus for injecting foam into a pipe, such as a sewer. For example, the injection may be used to kill root growths in sewers. A foam-conducting flexible tube has a terminal portion at its outlet having a through conduit for passage of the foam and a double wall therearound that provides an inflatable portion which, when inflated, can be used to plug the sewer to prevent backflow of foam. A flexible air conduit, which may be inside the main tube, enables the application of air pressure after insertion of the tube to a desired location to inflate the outer plugging wall. Foam is then delivered under pressure to go through the tube and its terminal portion and out beyond the plug portion and so to fill the sewer quickly with a foam which contains material for attacking the roots.

10 Claims, 4 Drawing Figures

FIG. 3

3,874,926
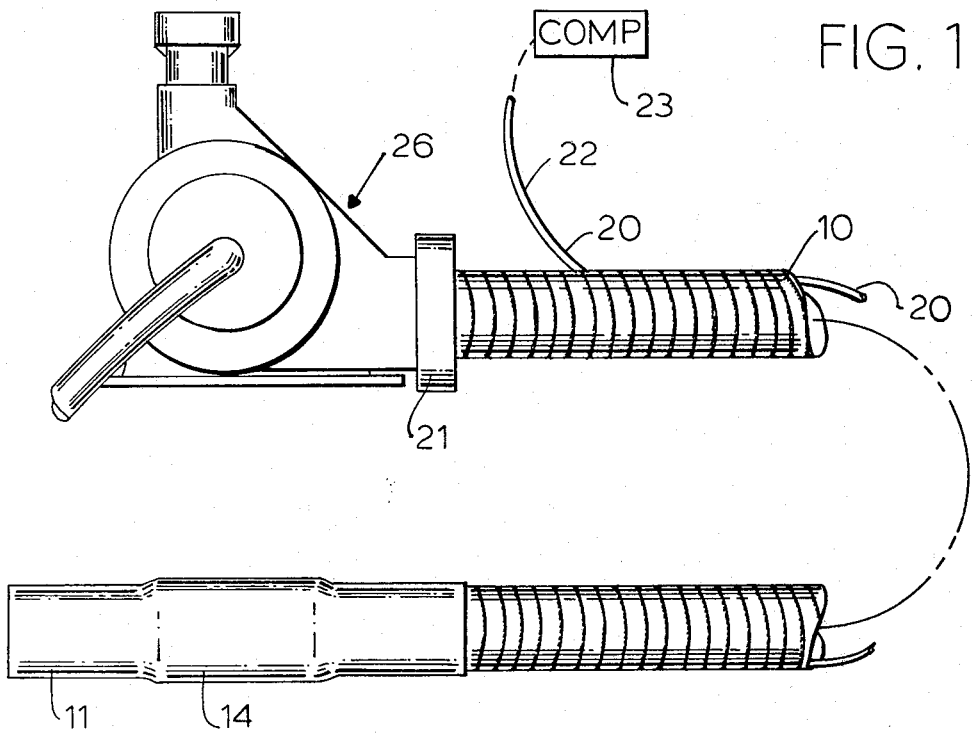
FIG. 1
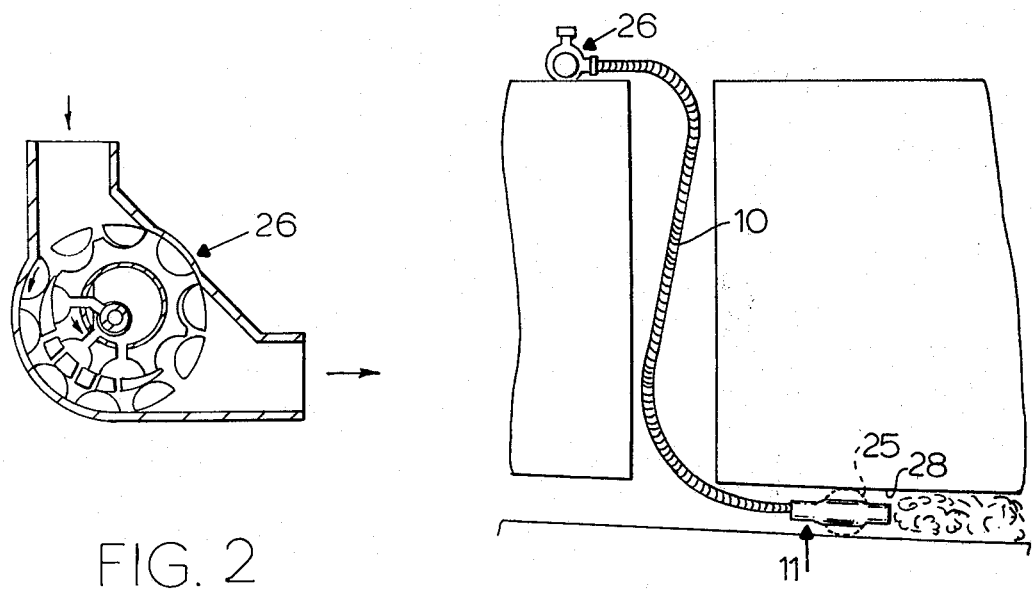
FIG. 2
FIG. 3

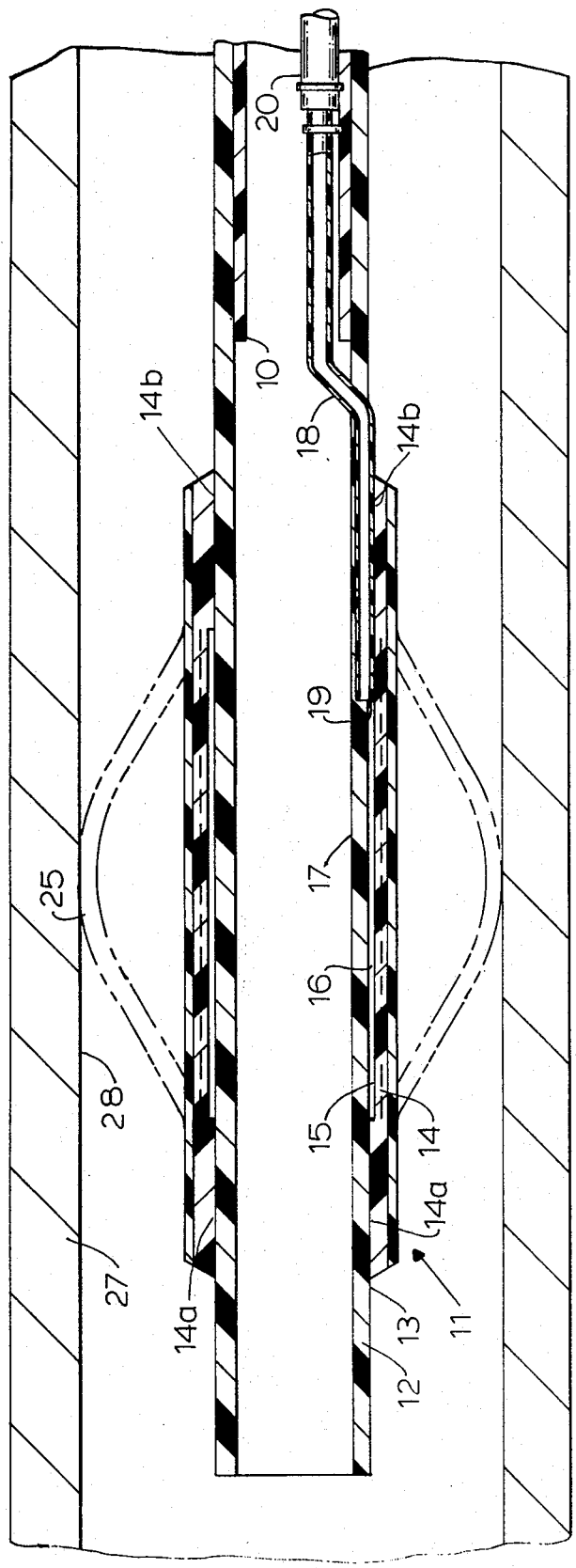

METHOD AND APPARATUS FOR INJECTING FOAM INTO A PIPE

BACKGROUND OF THE INVENTION

Earlier patents and patent applications of Frederick Horne have disclosed the use of certain chemical compositions to kill and control root growth in sewers. Several ways of using these compositions have been shown. For example, a combination of sodium methyldithiocarbamate and a grease-dissolving surfactant, with or without dichlobenil can be used with other ingredients to produce a foam which tends to cling to pipe walls and with which a pipe can be filled for a period of time long enough to give the desired reaction.

There are, however, problems in properly placing such foam in the pipe. Most of the previous methods have relied on generating the foam at a conduit outlet located within the sewer pipe; in some cases the outlet itself is moved along through the pipe while the foam is being produced. However, the foam can be produced more efficiently and a better quality of foam generated outside the pipe by an apparatus which is inherently incapable of being inserted into the sewer pipe. One of the problems then encountered has been that the foam, being mostly air or gas and light in weight, tends to flow back upstream from the outlet where it is placed into the pipe and not to move to an effective position downstream. The present invention is devised to overcome these difficulties and to provide an efficient system for applying to the sewer foam generated outside the sewer, rather than being generated in situ, near the point where it will make contact with the walls.

SUMMARY OF THE INVENTION

The present invention provides a foam-conducting flexible tube having an inlet outside the pipe or sewer and having at its outlet end a terminal tube with a through conduit for passage of the foam. The terminal tube has a double wall, one stiff inner wall for conducting the foam and another much more flexible outer wall which can be expanded outwardly to plug the sewer or other pipe, and thereby prevent the backflow of foam between the sewer (or other pipe) and the flexible tube.

A flexible air conduit, much smaller in diameter than the flexible tube or its terminal portion, has its outlet connected to the space between the two walls of the terminal tube. This flexible air conduit may lie outside the flexible tube but preferably it lies inside, where it is better protected and where it does not interfere due to its small diameter. Near the inlet end of the flexible foam-conducting tube, this flexible air conduit is passed through the wall of the foam-conducting flexible tube, so that it can be connected to an air compressor. The air compressor then enables inflation of the outer wall of the terminal portion to achieve the necessary sealing or blocking-off of the pipe, and then to maintain that blocking off.

A suitable foam-generating pump is connected to the inlet end of the foam-conducting flexible tube. This pump mixes the root-treating material with water and air and generates and delivers the foam into the pipe. The foam is sent under sufficient pressure so that a desired length of the sewer can be filled quite rapidly.

Other objects and advantages of the invention will appear from the following description of a preferred embodiment.

BRIEF DESCRIPTION OF THE DRAWINGS

In the drawings:

FIG. 1 is a view in side elevation of an apparatus embodying the principles of the invention. The conduits are broken in the middle to avoid having to show their entire length.

FIG. 2 is a view in elevation and in section of a portion of the foam-generating pump.

FIG. 3 is a somewhat diagrammatic view in side elevation of a typical installation of the apparatus of the invention shown on a smaller scale than FIG. 1.

FIG. 4 is a view on an enlarged scale of the terminal portion of the apparatus of FIG. 1, with the inflated position shown in broken lines and the uninflated position shown in solid lines.

DESCRIPTION OF A PREFERRED EMBODIMENT

The invention comprises a flexible tube 10 of suitable strength and sufficient rigidity so that it remains erected rather than collapsing, but yet is flexible enough to bend around corners to enable its use along the general idea of that shown in FIG. 3. The tube 10 may comprise a plastic or synthetic rubber pipe of a type which is resistant to the chemicals employed. It may have some reinforcement or strengthening around its circumference to maintain the rigidity, if that be desired.

The tube 10 is provided with a terminal tube 11, which may be, if desired, an integral portion of the entire tube or may be a separate element which is joined to it, as shown here. The terminal portion 11 has a main conduit wall 12 which is connected to and in a sense, at least, is part of the conduit 10, although it may be actually a separate member, as shown in FIG. 4. The conduit 12 is easily attachable to but is not easily detachable from the tube 10, this function being obtained normally simply by the fact that the synthetic rubber or plastic material from which it is made has a very high coefficient of friction relative to the material of the tube 10 or by a metal band or adhesive or both. The wall 12 need not be flexible, is preferably rather stiff, and in fact may be substantially rigid, so that it will not be collapsed inwardly by applied air pressure. It is relatively short and can therefore be passed around turns.

The terminal tube 11 has a double wall. Around the outer surface 13 of the inner wall 12 is an outer wall 14, of much more easily deformable material than the wall 12. The end portions 14a and 14b of the wall 14 are sealed, as by vulcanization to the outer periphery 13, but in between the portions 14a and 14b, the inner periphery 15 of the wall 14 (which is preferably relieved or thinned out there) stands away from the outer periphery 13 of the wall 12, leaving an annular air space 16. If desired, the portion 17 of the wall 12 which lies within the annular recess 15 and between the portions 14a and 14b may be strengthened by a layer of cord or metal or other rigidity-providing material so that the wall 12 will not collapse inwardly when the air space 16 is subjected to air under pressure.

Air may be conducted to the space 16 by a flexible conduit 18 having an outlet 19 exiting into the space 16. The conduit 18 may be connectable to (or integral with) a conduit 20, which is a long flexible conduit of substantially the same length as the conduit 10 and which, preferably, goes through the conduit 10 for most of its length. The conduit 20 is better protected by being inside the tube 10 and since its cross sectional area is very small compared to that of the tube 10, the conduit 20 can be located inside without in any way affecting the efficiency of the operation.

Near the inlet end 21 of the tube 10, an inlet portion 22 of the conduit 20 is brought out through the wall of the tube 10 and is connected to a suitable air compressor 23. In this manner, compressed air may be sent through the conduit 20 and the conduit 18 into the space 16, to provide a substantial pressure against the wall 14 and since the wall 14 is much more flexible than the wall portion 17, the wall 14 will be inflated and caused to expand outwardly. It can expand a considerable amount to form a bulbous projection, as shown in broken lines at 25 in FIGS. 3 and 4, so that it comes up against the inner surface 28 of the sewer pipe 27 and therefore blocks passage of material. This is important, because the foam is light and tends to flow uphill if this is not done.

The inlet 21 of the flexible tube 10 is connected to a foam-generating member 26. This may be a suitable type of pump such as that shown schematically in FIG. 2 in which air and liquid are introduced, and the generator whips large quantities of the air into the liquid. Since the liquid is material which when whipped with air forms foam, it is very easy to generate the foam. Thus, a typical device which may be used is made by The Waukesha Foundry Company, Inc., and which has a screened air inlet and a 4-foot liquid inlet hose and strainer. As an outlet, a ¾-inch garden hose type of structure may be provided. A half-horsepower motor may be used to achieve a speed of about 1,725 rpm. Such a device is efficient in generating and sending out foam in quantity and rapidly, so that sewer laterals and septic tank lines of normal length can be filled within a few minutes, typical foam output being 10 gallons per minute from a half gallon per minute of the liquid mixture. The mixture is preferably 95% water and 5% a suitable foam-making root treatment product containing a surfactant which helps to retain the foam structure. The foam and its active ingredients, once injected, remain clinging to the roots and other internal pipe surfaces for some time even after normal water flow has been resumed, thereby delaying regrowth of roots and insuring better clearance. This clinging effect prolongs the treatment, assuring effective uptake by the roots of a toxic quantity of the chemical to assure complete kill and extended regrowth control.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. Apparatus for injecting foam into a pipeline, including in combination:
   a foam-conducting flexible tube having an inlet and a terminal portion having a through outlet for the foam and a tube wall having therearound an inflatable plugging portion, which can be enlarged by inflation to bear against the wall of the pipe and prevent the foam from flowing back between said tube and said pipe,
   a flexible air conduit much smaller in diameter than said tube and having an inlet and an outlet connected to said inflatable plugging portion,
   means for delivering compressed air to the inlet of said air conduit for inflating and retaining inflation of said plugging portion, and
   means for producing foam and delivering it under pressure to said inlet of said foam-conducting tube.

2. The apparatus of claim 1 wherein said flexible air conduit lies inside said foam-conducting tube for at least most of its length.

3. The apparatus of claim 1 wherein said flexible air conduit passes through the wall of said foam-conducting tube adjacent to said inlet.

4. Apparatus for injecting foam into a pipe, including in combination:
   a foam-conducting flexible tube having an inlet and an outlet,
   a terminal tube connected to said outlet of said foam-conducting tube and having a stiff-walled through conduit for the foam and a tube wall having therearound an inflatable plugging portion including a flexible wall which can be enlarged by inflation to bear against the wall of the pipeline and prevent the foam from flowing back between the tubes and the pipeline,
   a flexible air conduit much smaller in diameter than said tubes and having a terminal end connected to said plugging portion and substantially the same length as said flexible tube,
   means for delivering compressed air to said air conduit for inflating and retaining inflation of said plugging portion, and
   means for producing foam and delivering it under pressure to said inlet of said foam-conducting tube.

5. The apparatus of claim 4 wherein said flexible wall is vulcanized at each end to said stiff-walled conduit.

6. The apparatus of claim 4 wherein said stiff-walled conduit is reinforced to increase its stiffness.

7. The apparatus of claim 4 wherein said flexible air conduit lies inside said foam-conducting tube for at least most of its length.

8. The apparatus of claim 4 wherein said flexible air conduit passes through the wall of said foam-conducting tube adjacent said inlet.

9. The apparatus of claim 4 wherein said means for producing foam comprises a foam-generating pump that whips air into a suitable liquid to form said foam.

10. A method for injecting foam into a pipe comprising:
    inserting into said pipe a foam-conducting flexible tube having an inlet and an outlet at a terminal portion where the tube wall has an outlet surrounded by an inflatable plugging portion, which can be enlarged by inflation to bear against the wall of the pipeline so as to prevent foam from flowing back between the tubes and the pipeline,
    sending air under pressure to said plugging portion to inflate it and plug said pipe,
    retaining said inflation during foam injection,
    generating said foam exterior to said pipe,
    delivering said foam under pressure to said inlet of said foam-conducting tube and then through to said outlet.

* * * * *